United States Patent [19]
Jeong

[11] Patent Number: 5,572,402
[45] Date of Patent: Nov. 5, 1996

[54] HARD DISK DRIVE MOUNTING ASSEMBLY FOR A COMPUTER

[75] Inventor: Taehwan Jeong, Kyungki-do, Rep. of Korea

[73] Assignee: Samsung Electronics Co., Ltd., Suwon, Rep. of Korea

[21] Appl. No.: 381,516

[22] Filed: Feb. 1, 1995

[30]    Foreign Application Priority Data

Feb. 2, 1994 [KR] Rep. of Korea ................. 94-1949

[51] Int. Cl.⁶ .................. G06F 1/16; H05K 7/16
[52] U.S. Cl. ............... 361/685; 361/727; 364/708.1
[58] Field of Search ................. 361/680–686, 361/724–727; 364/708.1; G06F 1/16

[56]    References Cited

U.S. PATENT DOCUMENTS

| 4,669,053 | 5/1987 | Krenz | 364/708.1 |
| 5,021,922 | 6/1991 | Davis et al. | 361/680 |
| 5,247,428 | 9/1993 | Yu | 361/680 |
| 5,442,513 | 8/1995 | Lo | 361/685 |

FOREIGN PATENT DOCUMENTS

| 921726 | 2/1992 | Rep. of Korea . |
| 926316 | 4/1992 | Rep. of Korea . |
| 9213240 | 7/1992 | Rep. of Korea . |
| 9213239 | 7/1992 | Rep. of Korea . |

*Primary Examiner*—Leo P. Picard
*Assistant Examiner*—Lynn D. Feild
*Attorney, Agent, or Firm*—Allen LeRoy Limberg

[57]    ABSTRACT

A hard disk drive mounting assembly for a computer comprises a hard disk drive case held in the computer body by pins oppositely protruding from respective lower portions of the exterior surfaces of a pair of opposed sides of the hard disk drive case, having rails on the interior surfaces of those opposed sides, and having apertures in those opposed sides into which rail hooks can be inserted. The hard disk drive case can be tipped open or closed by turning around the pins as aligned separated axles. The had disk drive case is held closed by spring catches that engage notches in the computer body. The hard disk drive has slide members on its both sides and has rail hooks at predetermined positions on the sliding members for engaging the apertures in the opposed sides of the hard disk drive case. The hard disk drive mounting assembly utilizes the space of the computer body efficiently and permits mounting or removing a hard disk from the computer without any special implement.

16 Claims, 6 Drawing Sheets

HARD DISK DRIVE MOUNTING ASSEMBLY FOR A COMPUTER

The invention relates to a hard disk drive mounting assembly for a computer and, more particularly, to a hard disk drive mounting assembly permitting a user to mount or remove a hard disk drive from a computer easily without the use of any special implement.

BACKGROUND OF THE INVENTION

Generally, a hard disk drive is installed inside the body of a computer and serves as an auxiliary memory device to store and keep data. A user has to use a screwdriver to unfasten several screws connecting a cover to the body of the computer system and open the cover in order to mount or remove the hard disk drive from the computer. Especially in a portable computer, after a hard disk drive is placed within the computer body against a bottom plate thereof, the hard disk drive is connected by means of a plurality of screws inserted from the bottom of the computer body through holes in the bottom plate and screwed into threaded holes in the hard disk drive. Generally, when inserting or removing the hard disk drive from the portable computer, the user has to turn the computer body over and rest it on its opened top, which is apt to cause damage to the computer.

Most conventional hard disk drives are installed inside computer systems and are packed in resin molds, which interferes with portability from one computer system to another. Practically speaking, it is impossible for a user to carry the hard disk drive with him to another computer system. The information on the hard disk drive has to be downloaded to another storage medium and read back therefrom to the other computer system in order to be able to transfer the information on the hard disk drive to the other computer system.

To make the hard disk drive more portable, Korean Utility Model Application No. 92-1726 filed Feb. 6, 1992 discloses a hard disk drive mounting assembly for a portable computer. The assembly comprises a lower plate having a plurality of guide projections, a rail and incisive grooves on both sides for connection to a computer body by bolts, a slider having holes into which the guide projections are inserted, and a sill on which the rail reposes, a hard disk drive combined with the lower plate and moving along with the lower plate, and a cover combined with the lower plate and surrounding the hard disk drive. A user opens the cover and removes the slider to the outside by separating the slider front the lower plate via the rail, in such a manner that the hard disk drive may be removed from the slider.

Korean Utility Model Application No. 92-13239 filed Jul. 16, 1992 discloses a hard disk drive mounting structure for a portable computer. According to this scheme, a block is fixedly mounted on a point to which the hard disk drive is inserted; a holder connector is rotatably installed on the block inserting a torsion spring; and a hard disk drive connector is mounted detachably on the holder connector. The hard disk drive is inserted into the holder connector of the block, and is mounted on the portable computer so as to be rotatable by the torsion spring.

In either of the above-mentioned schemes, a hard disk drive may be mounted or removed from the computer system without the use of any additional separating device but there is still the inconvenience of having to open the cover of the computer system. Korean Patent Application No. 92-6316, filed Apr. 15, 1992 and entitled in translation "Hard disk drive mounting structure of a portable computer and a method therefor", and Korean Patent Application No. 92-13240, filed Jul. 16, 1992 and entitled in translation "Hard disk drive mounting structure of a portable computer", describe methods for directly mounting a hard disk drive on the inside of a computer system without having to open a cover thereof.

The hard disk drive mounting assembly disclosed in Korean Patent Application No. 92-6316 comprises a drawing plate having guide protrusions on the inner sidewalls, drawing pieces on the lower ends, and elongated apertures, a lower plate having stoppers that engage with the drawing pieces, and mobile members elastically coupled to pins formed in the lower plate, by an inserting torsion spring. In the operation of the hard disk drive mounting assembly, the locking of the mobile members is released from a cabinet, and only the drawing plate is pulled out. After that, a connector of the cabinet is separated from a connector of the hard disk drive, and the drawing plate and lower plate are pulled out simultaneously so that the hard disk drive installed in the lower plate may be separated.

The hard disk drive mounting assembly of Korean Patent Application No. 92-13240 comprises a slide member with which the hard disk drive couples, a guide board disposed in a sash housing and moving the slide member to the coupling point, and an elastic member disposed on the rear side of the guide board and applying elastic force when the hard disk drive is removed. In the hard disk drive mounting assembly, the hard disk drive is disposed inside the slide member and is fixedly disposed on a pair of boards mounted on the slide member by means of a screw. The hard disk drive is pushed into the sash housing to be mounted on the computer system when a horizontal elongated part formed on the slide member is pressed by an elastic projection provided on the guide board of the sash housing.

However, since the above structures require an additional plate or a slide member that connects the hard disk drive by a screw, their structures tend to be complicated. And the hard disk drive mounting assembly is installed in a lengthwise direction on the bottom of the computer body which takes up a great amount of space, which makes it difficult to reduce the size of the computer system.

The inventor sought a hard disk drive mounting assembly for a computer that permits a hard disk drive to be mounted within the computer system or removed therefrom without the use of any special implement and that efficiently utilizes the space within the computer system.

SUMMARY OF THE INVENTION

An aspect of the invention is embodied in a computer for use with a hard disk drive having opposed parallel first and, second sides; having a third side perpendicular to each of the first and second sides thereof; having a first slide member located on the first side thereof, oriented so as to parallel the third side thereof, and provided with a first rail hook; and having a second slide member located on the second side thereof, oriented so as to parallel the third side thereof, and provided with a second rail hook. The computer comprises a body having a hole between the exterior and interior surfaces of one of its sides, which hole opens into an interior void within that body; a hard disk drive case which the hard disk drive can be inserted into or withdrawn from; and first and second hinges each of pin and eye type for swinging the hard disk drive case through the hole in the computer body side to push the case into the void within the computer body or pull it out. The hole in the body side has opposed parallel straight first and second hole sides of similar lengths and has a straight third hole side perpendicular to both the first and second hole sides. The first hinge has a first pin and a first eye. That first eye is attached to the interior surface of the body side next to an end of the third hole side meeting the second hole side and is oriented for receiving the first pin, which is directed away from the hole in a direction parallel to the third hole side. The second hinge has a second pin and a second eye. That second eye is attached to the interior surface of the body side next to an end of the third hole side meeting the second hole side and is oriented for receiving the second pin, which is directed away from the hole in a direction parallel to the third hole side. The hard disk drive case has an open first end and a second end opposite the first end near which second end the first and second hinges are located to enable the hard disk drive case to swing in and out of the interior void in the computer body. The hard disk drive case has opposed parallel first and second case sides that extend between its first and second ends and that are spaced for fitting through the hole through the body side close to its said first and second sides respectively. The hard disk drive case also has a third case side that extends between its first and second ends, that is perpendicular to the first and second case sides abutting thereagainst, and that closes the hole through the body side when the hard disk drive case is swung into the void within the computer body, a first channel rail located on an interior surface of the first case side so as to parallel the third case side, a second channel rail located on an interior surface of the second case side so as to parallel the third case side, and has the first and second pins respectively protruding from an exterior surface of the first rectangular case side and from an exterior surface of the second rectangular case side. The hard disk drive case has a first aperture extending through the channel of the first channel rail and the first case side at a location suitable for receiving the first rail hook when the hard disk drive is inserted within the hard disk drive case. The hard disk drive case has a second aperture extending through the channel of the second channel rail and the second case side at a location suitable for receiving the second rail hook when the hard disk drive is inserted within the hard disk drive case.

A hard disk drive mounting assembly for a computer embodying an aspect of the invention comprises: a hard disk drive having slide members on its both sides and having rail hooks at predetermined positions on the sliding members; and a hard disk drive case having an open first end for receiving the hard disk drive and having a second end opposing its first end, having a pair of opposed sides extending between the first and second ends, having channel rails on the interior surfaces of those opposed sides, and having apertures in the channels of those channel rails extending through the opposed sides into which apertures the rail hooks can be inserted. The hard disk drive case is held in the computer body by pins protruding oppositely from respective lower portions of the exterior surfaces of its opposed sides, so the hard disk drive case can be tipped open or closed by turning around the pins as aligned separated axles.

DETAILED DESCRIPTION OF THE PREFERRED EMBODIMENT

Figure 1:
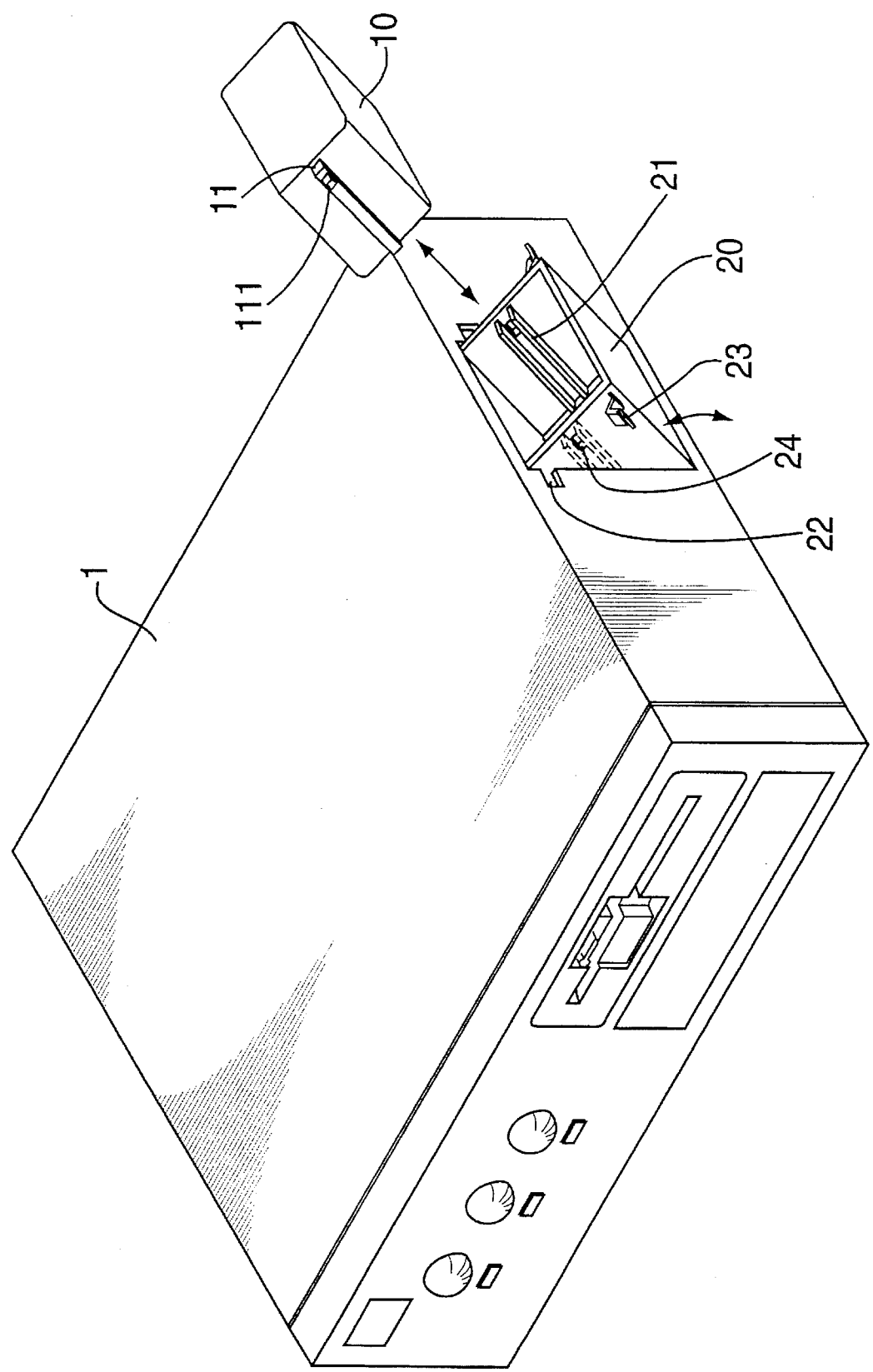
FIG. 1 depicts an operating condition of a hard disk drive for a computer in accordance with the present invention.
Figure 3:
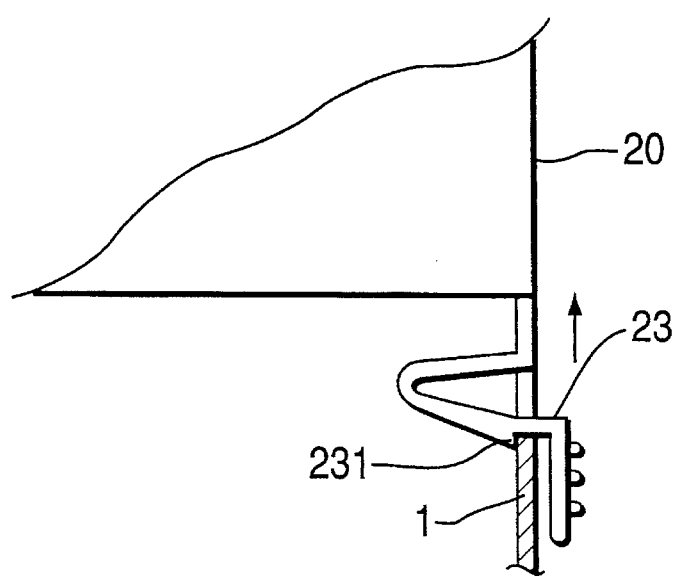
FIG. 3 depicts a locking device of a hard disk drive case in accordance with a preferred embodiment of the present invention.

As shown in FIG. 1, in addition to a hard disk drive 10, the hard disk drive mounting assembly embodying the invention in one of its aspects includes a hard disk drive case 20 mounting on the side surface of a computer body 1 and turning through a predetermined angle around an axis of rotation near the bottom of that case 20. This permits the case 20 to be tipped to an open position in which an opening in the top of the case 20 is accessible from outside the computer body 1 or to be tipped back to a closed position in which the opening in the top of the case 20 is within the computer body 1. As shown in FIGS. 1 and 3, spring catches 23 for locking the hard disk drive case 20 in its closed position within the computer body 1 are formed on opposite sides of the hard disk drive case 20, and predetermined notches 22 are formed on the computer body 1 into which notches 22 the spring catches 23 are inserted.

Figure 2:
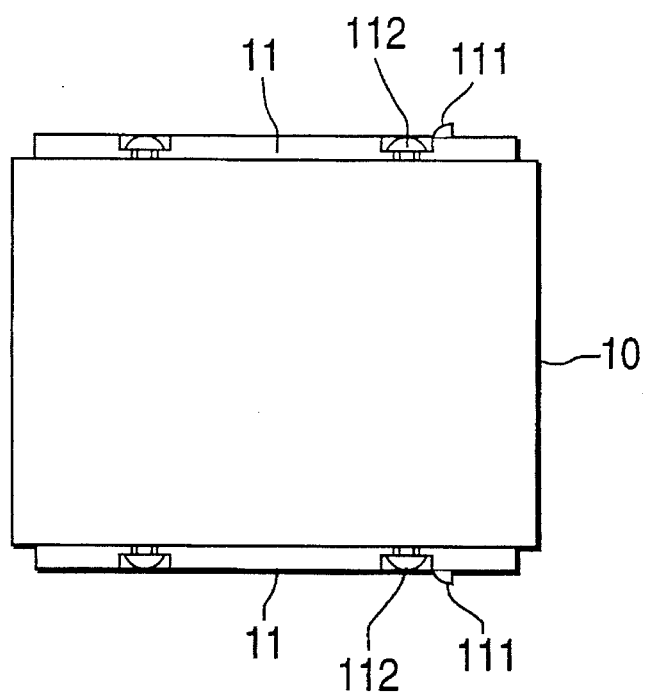
FIG. 2 is a plan view of a hard disk drive in accordance with the present invention.

The hard disk drive 10, as shown in FIG. 2, includes a pair of slide members 11 connected to opposite sides of the hard disk drive 10 by screws 112 and further includes rail hooks 111 respectively formed on the pair of slide members 11.

Figure 7:
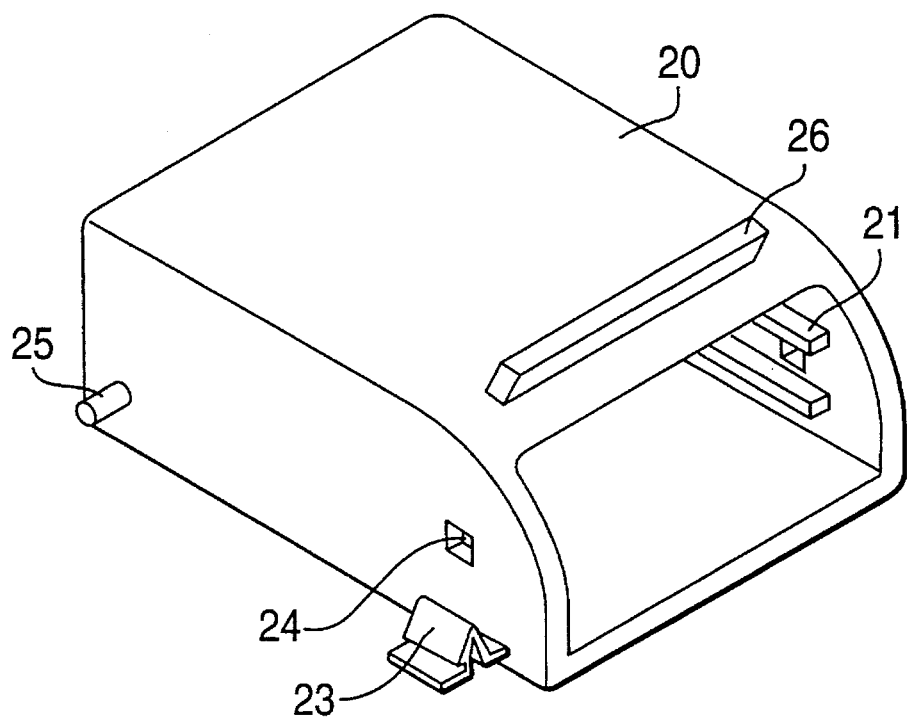
FIG. 7 is a perspective view of the hard disk drive case in accordance with a preferred embodiment of the present invention.
Figure 9:
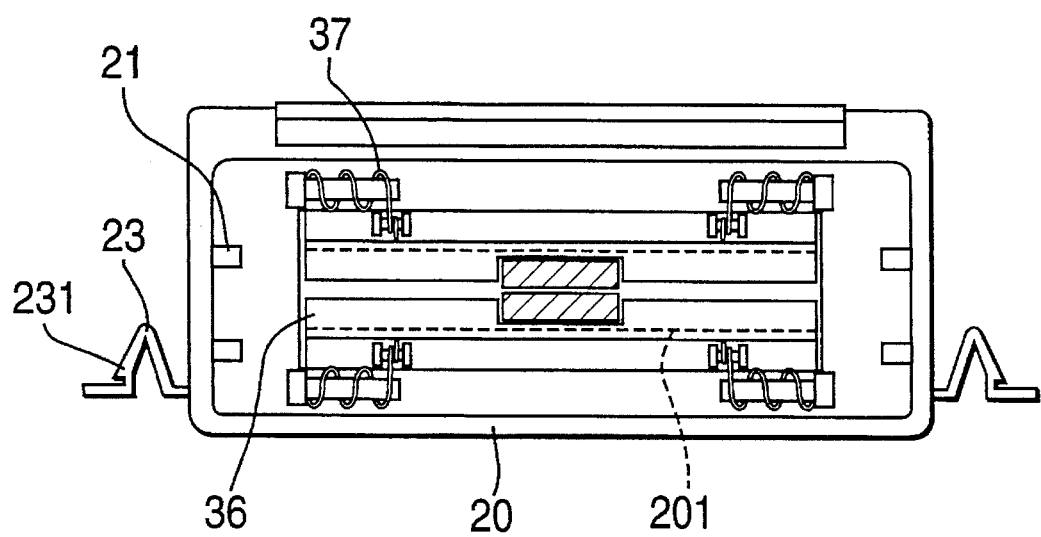
FIG. 9 is a plan view of the hard disk drive case in accordance with a preferred embodiment of the present invention.
Figure 10:
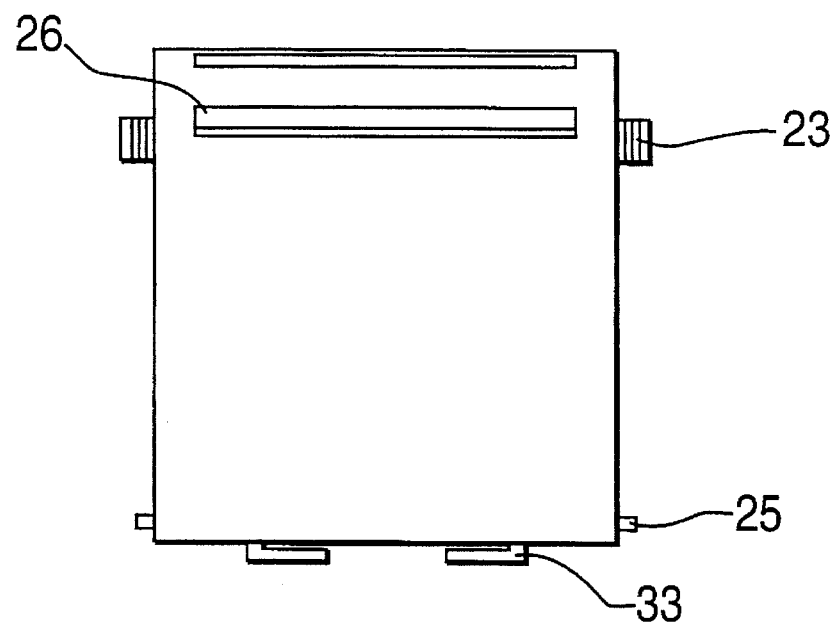
FIG. 10 is a rear view of the hard disk drive case in accordance with a preferred embodiment of the present invention.
Figure 11:
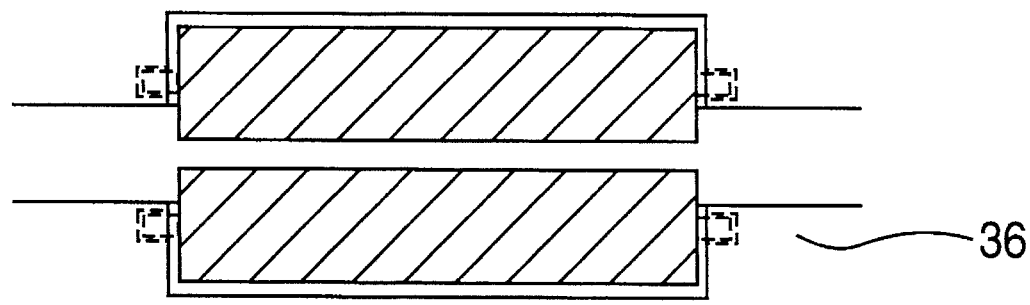
FIG. 11 is a plan view of rollers of the hard disk drive case in accordance with a preferred embodiment of the present invention.

Referring now to FIGS. 7 and 9, channel rails 21 for guiding the sliding means 11 of the hard disk drive 10 are formed on the interior surfaces of opposed sides of the hard disk drive case 20. Apertures 24, which extend through the sides of the hard disk drive case 20, are formed within the channel rails into which apertures 24 the rail hooks 111 formed on the sliding members 11 can be inserted. Pins 25 protrude from the lower ends of the opposed lateral sides of the hard disk drive case 20, which pins are inserted into eyes formed in the computer body 1, in order to complete pin-and-eye hinges that connect the hard disk drive case 20 to the computer body 1. A stop 26 having a predetermined width and a predetermined length is formed on the upper end of the back side of hard disk drive case 20 to constrain the outward tilt of the hard disk drive case 20 from the computer body 1.

Figure 4:
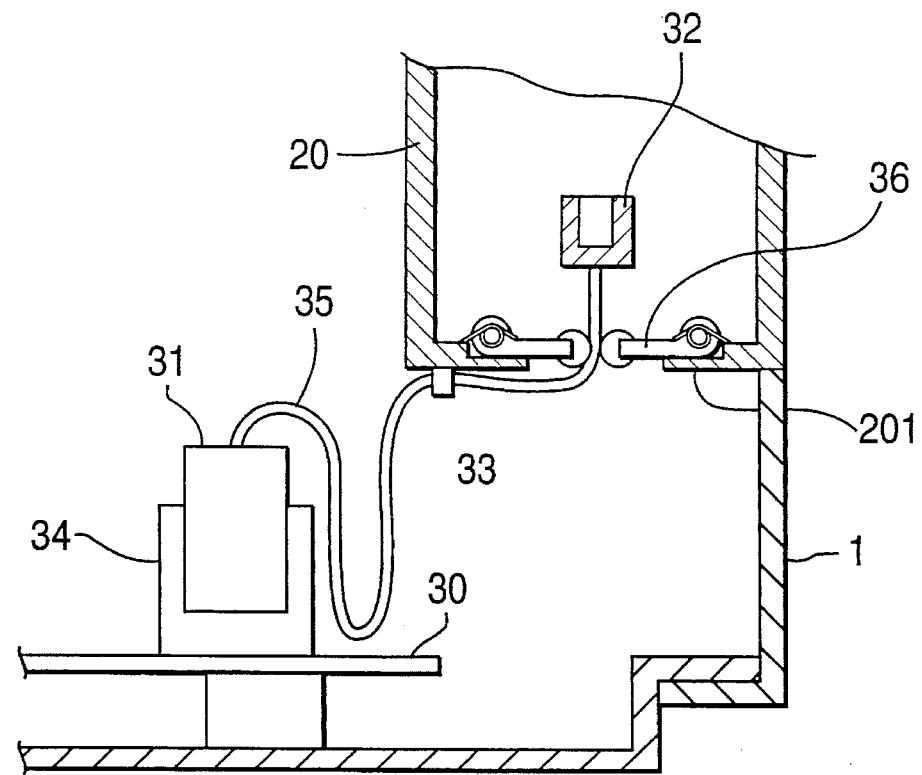
FIG. 4 is a sectional view of a hard disk drive case in accordance with a preferred embodiment of the present invention.
Figure 5:
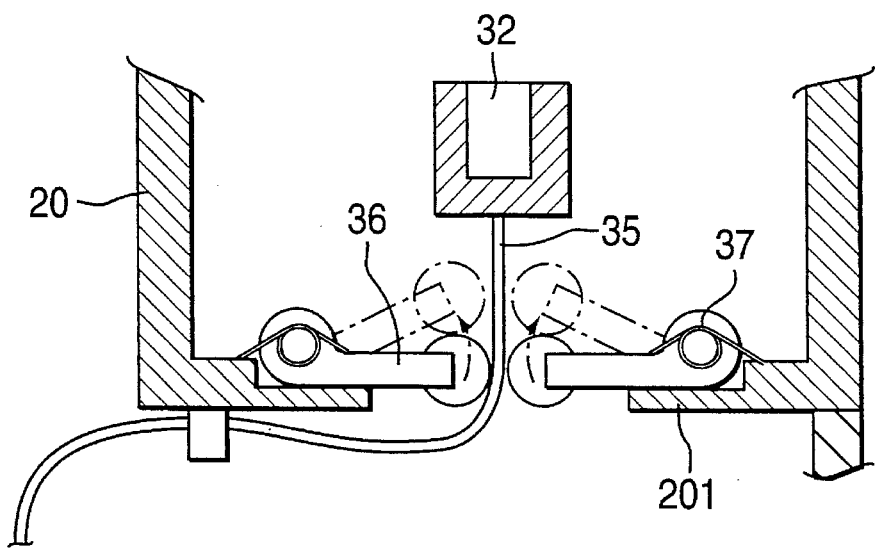
FIG. 5 is an enlarged view of a case door of FIG. 4.

Supports 201 are shelf-like portions of the hard disk drive case 20 floor adjacent to a doorhole therethrough. A pair of case doors 36 swing to close into that doorhole leaving a space between them, are stopped from further swing by the shelf-like supports 201, and are held closed against the supports 201 by torsion springs 37, as shown in FIGS. 5 and 9. As shown in FIG. 9 the edges of the case doors 36 do not meet when the doors are closed, but have a space between them for admitting a cable 35 shown in FIGS. 4 and 5. The cable 35 is provided at its respective ends with connectors 31 and 32, the connector 31 for connecting with a connector 34 installed on a main board 30 of the computer located within its body 1 and the connector 32 for connecting with a connector on the hard disk drive 10. A spring holder 33 is provided for holding the cable 35 near the lower surface of the hard disk drive case 20 floor or bottom. As shown in FIGS. 4, 5 and 9 the edges of the case doors 36 which do not meet when the doors are closed have rollers on them to facilitate pushing the connector 32 through the case doors 36. Alternatively, a rounded piece of plastic with a low coefficient of friction can be used instead of each roller.

The operation of the hard disk drive mounting assembly of the computer is now to be described. A user secures the cable 35 to the bottom of the hard disk drive case 20 floor by pressing it through a hole in the spring cable holder 33 as shown in FIG. 4, which hole springs closed or partially closed when pressure is released. Then the user connects the connector 31 connected to one end of the cable 35 with the connector 34 on the main board 30 of the computer system. The cable holder 33 prevents the connector 32 from straying down the case doors 36 and prevents the cable 35 from dangling too far inside the computer body 1, particularly into the portion of the computer body 1 below the void into which the hard disk drive case 20 fits when in the closed position. After that, the user pushes the connector 32 at one end of the cable 35 through the case doors 36 into the hard disk drive case 20. When the connector 32 is inserted through the case doors 36, the spring-loaded case doors 36 are opened inward into the hard disk drive case 20. After the connector 32 is inserted within the hard disk case 20, the restoring force of the torsion springs 37 recloses the case doors 36. The operating range of the case doors 36 is limited by the supports 201 of the hard disk drive case 20; and, when closed, the case doors 36 are essentially flush within the floor of the hard disk drive case 20. Accordingly, after the connector 32 is inserted within the hard disk drive case 20 the case doors 36 prevent the connector 32 from falling into the portion of the computer body 1 below the void into which the hard disk drive case 20 fits when in the closed position.

After the user inserts the connector 32 of the cable 35 inside of the hard disk drive case 20, he pulls the connector 32 and the cable 35 from the top opening of the case 20 and connects the connector 32 to a mating connector on the hard disk drive 10. After that, he inserts the sliding members 11 installed on both sides of the hard disk drive 10, into the channel rails 21 formed on the interior surfaces of the lateral sides of the hard disk drive case 20. When the hard disk drive 10 is inserted into the hard disk drive case 20, the rail hooks 111 formed on the sliding members 11 of the hard disk drive 10 come to be inserted into the apertures 24 formed in the channel of each channel rail 21 of the hard disk drive case 20, and the hard disk drive 10 is attached to the hard disk drive case 20. When the hard disk drive 10 is completely inserted into the hard disk drive case 20, the user tips the hard disk drive case 20 back into the computer body 1.

Figure 6:
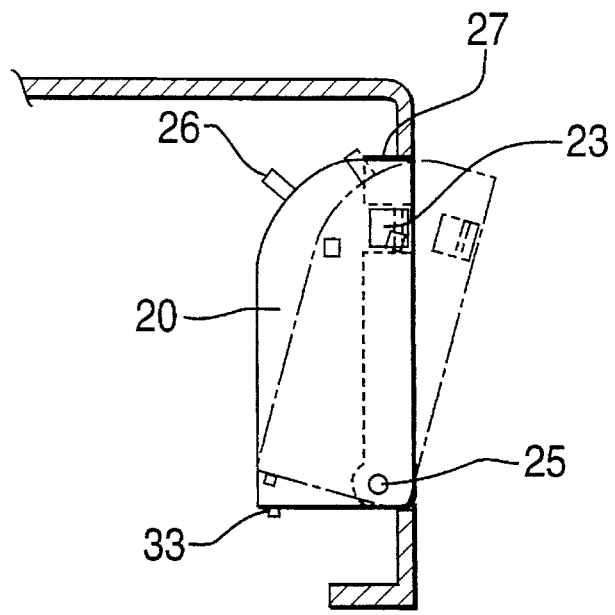
FIG. 6 depicts an operating condition of the hard disk drive case in accordance with a preferred embodiment of the present invention.

Since the pins 25 protruding on both sides of the lower end portions of the hard disk drive case 20 engage with respective eyes in the computer body 1 to form pin-and-eye hinges, as shown in FIG. 7, if the user pushes the hard disk drive case 20 toward the side of the computer body 1, the hard disk drive case 20 turns around the pins 25 as axles to fit into a void inside the computer body 1. When the user pulls the hard disk drive case 20 from the computer body 1, the hard disk drive case 20 comes out of the void inside computer body 1, turning around the pins 25 as axles, as shown in FIG. 6. In such case, when the hard disk drive case 20 rotates through a predetermined angle from its closed position, turning around the pins 25 as axles, the stop 26 encounters the protrusion 27 to stop the rotation. This prevents the hard disk drive case 20 from being opened too far, so as to avoid inconvenience during the operation of mounting the hard disk drive 10.

After the hard disk drive 10 is installed in the hard disk drive case 20, when the hard disk drive case 20 is pushed into the computer body 1, turning around the pins 25 as axles, the spring catches 23 respectively mounted on both sides of the hard disk drive case 20 operate to secure the hard disk drive case 20 within the computer body 1. These spring catches 23 have elastic force tending to make them expand within the notches 22 formed on the computer body 1 and include snags 231 that catch within the computer body 1. Therefore, when a user pushes the spring catches 23 of the hard disk drive case 20 into the notches 22 formed on the computer body 1, the spring catches 23 will insert themselves into the notches 22 with the elastic force of the spring catches 23 maintaining the snags 231 caught within the computer body 1. When the snags 231 get caught behind the computer body 1, the spring catches 23 will not open without physical force being applied from outside the computer body 1 to compress the spring catches 23 sufficiently to let the snags 231 fit through the notches 22 formed on the computer body 1.

Figure 8:
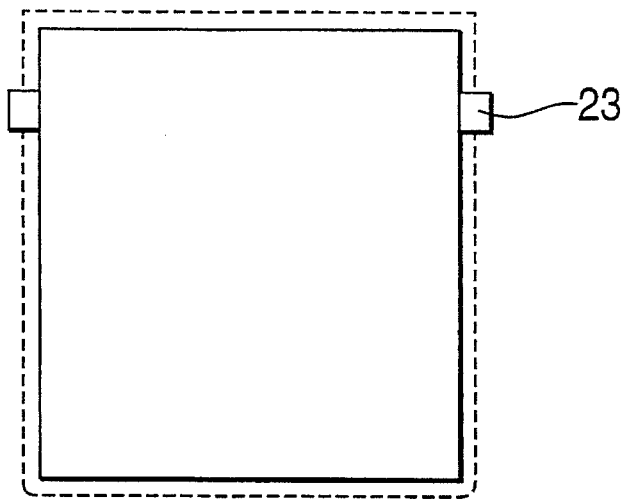
FIG. 8 is a front view of the hard disk drive case in accordance with a preferred embodiment of the present invention.

FIG. 8 shows the computer body 1 when the spring catches 23 are completely closed, after the hard disk drive case 20 has been installed in the computer body 1. In order to insert or remove the hard disk drive 10 from the computer body 1, the user moves the spring catches 23 in the notches 22 in the direction of an arrow shown in FIG. 3 to release the snags 231 of the spring catches 23 that catch within the computer body 1.

When the spring catches 23 are pulled forward, the hard disk drive case 20 opens out from the computer body 1, rotating through an angle bounded by the stop 26, to be in an open position permitting the hard disk drive 10 to be inserted into or removed from the computer body 1. The user then pushes the rail hooks 111 that are semi-elliptical to force the rail hooks 111 out of the apertures 24 formed within the channels of the channel rails 21 of the hard disk drive case 20, so the hard disk drive 10 can be extracted. The user pulls the hard disk drive 10 upward to separate the hard disk drive 10 from the connector 32, so that the hard disk drive 10 may be removed from the hard disk drive case 20.

In a variant of the hard disk drive mourning assembly described above, the floor of the hard disk drive case 20 does not have a doorhole therein, and the case doors 36 and the torsion springs 37 are dispensed with. The connection 32 is mounted within the floor of the hard disk drive case 20 positioned to receive a mating connection on the hard disk drive 10. The advantage of the connection 32 on the cable 35 having freedom to move with respect to the hard disk drive case 20 is that hard disk drives 10 from different suppliers that are slightly different as to the locations of their mating connection for connection 32 can be accommodated. In other variants of the hard disk drive mounting assemblies described above the hard disk drive case 20 tilts out of the computer body, not with its opening toward the top side of the computer, but toward the front side, back side or a lateral side of the computer. The degree of slippage of the cable 35 through the cable holder 33 can be adjusted in various designs from loosely holding the cable to firmly gripping the cable, a slight restraint on cable slippage being currently preferred. The spring cable holder 33 can be relocated to a position on the main body 1 of the computer. One skilled in, the art of designing packages for electronic equipment will be enabled by acquaintance with the foregoing disclosure to design readily a number of variants of the preferred embodiment, and this should be borne in mind when determining the scope of the claims which follow.

What is claimed is:

1. A computer for use with a hard disk drive having opposed parallel first and second sides; having a third side perpendicular to each of said first and second sides thereof; having a first slide member located on said first side of said hard disk drive, oriented so as to parallel said third side of said hard disk drive, and provided with a first rail hook; and having a second slide member located on said second side of said hard disk drive, oriented so as to parallel said third side of said hard disk drive, and provided with a second rail hook, said computer comprising:

a body including a body side having exterior and interior surfaces and having a hole between said exterior and interior surfaces of said body side that opens into an interior void within said body, said hole having opposed parallel straight first and second hole sides of similar lengths and having a straight third hole side perpendicular to both said first and second hole sides;

first and second hinges, each of pin and eye type, said first hinge having a first pin and having a first eye attached to the interior surface of said body side next to an end of said third hole side meeting said second hole side and oriented for receiving said first pin which is directed away from said hole in a direction parallel to said third hole side, said second hinge having a second pin and having a second eye attached to the interior surface of said body side next to an end of said third hole side meeting said second hole side and oriented for receiving said second pin which is directed away from said hole in a direction parallel to said third hole side;

a hard disk drive case having an open first end into which said hard disk drive can be inserted, having a second end opposite said first end near which second end said first and second hinges are located to enable said hard disk drive case to swing into said interior void in a closed position and to swing sufficiently out of said interior void in an open position to make its said open first end accessible for mounting or removing said hard disk drive therethrough, having opposed parallel first and second case sides that extend between said first and second ends and that are spaced for fitting through the hole through said body side close to its said first and second sides respectively, having a third case side that extends between said first and second ends perpendicular to said first and second case sides abutting thereagainst and that closes the hole through said body side when said hard disk drive case is swung into said interior, having first and second channel rails located on respective interior surfaces of said first and said second case sides so as to parallel said third case side, and having said first and second pins respectively protruding from an exterior surface of said first rectangular case side and from an exterior surface of said second rectangular case side, said first channel rail being located on the interior surface of said first case side such that the first slide member of said hard disk drive can be fitted within the channel of said first channel rail, said second channel rail being located on the interior surface of said second case side such that the second slide member of said hard disk drive can be fitted within the channel of said second channel rail, said hard disk drive case having a first aperture extending through the channel of said first channel rail and said first case side at a location suitable for receiving said first rail hook when said hard disk drive is inserted within said hard disk drive case, and said hard disk drive case having a second aperture extending through the channel of said second channel rail and said second case side at a location suitable for receiving said second rail hook when said hard disk drive is inserted within said hard disk drive case.

2. A computer as set forth in claim 1 wherein said hard disk drive case has spring catches that can insert into notches extending from said hole in said body side.

3. A computer as set forth in claim 2, wherein said spring catches have snags that in a locking condition get caught within said body near the ends of said notches and are released by physical force applied from outside to compress the spring catches and release the snags from the locking condition.

4. A computer as set forth in claim 1; wherein said hard disk drive case has a fourth side that extends between its said first and second ends, that extends between said first and second case sides, and that parallels said third case side; and wherein said hard disk drive case has a stop on the exterior surface of one of its said sides that presses against the inside surface of the computer body when said hard disk drive case is in its said open position.

5. A computer as set forth in claim 4 wherein said hard disk drive case has a stop on the exterior surface of its said fourth side.

6. A computer as set forth in claim 1 wherein the second end of said hard disk drive case is a closed end with a substantially rectangular doorhole therethrough provided with:

first and second case doors that swing from opposite edges of said doorhole, that are spring-loaded to close within said doorhole so as to be substantially flush with said closed second end, that open inward of said hard disk drive case, and that do not completely meet when closed.

7. A computer as set forth in claim 1 combined with said hard disk drive installed within said hard disk drive case of said computer, with said first and second slide members of said hard disk drive slid within the channels of said first and second channel rails of said hard disk drive case, and with said first and second rail hooks of said hard disk drive engaging said first and second apertures in said hard disk drive case.

8. A hard disk drive mounting assembly for a computer having a computer body with a hole in a side thereof, said hard disk drive mounting assembly to be used with a hard disk drive having slide members on its both sides and having rail hooks on predetermined positions of said sliding members, said hard disk drive mounting assembly comprising:

a hard disk drive case having an open first end into which hard disk drive can be inserted, having a second end opposing said first end, having a pair of opposed sides extending between said first and second ends, being held in the computer body by pins oppositely protruding from portions of exterior surfaces of said pair of opposed sides near their respective second ends, being rotatable utilizing said pins as aligned separated axles for swinging out of said computer body through said hole in said side thereof in an opening operation and for swinging back into said computer body through said hole in said side thereof in a closing operation, having channel rails on the interior surfaces of said pair of opposed sides for receiving respective ones of said slide members, and having a respective aperture extending through each channel rail and the one of said opposed sides it is on, into which said apertures the rail hooks may be inserted.

9. A hard disk drive mounting assembly as set forth in claim 8, wherein said hard disk drive case further has spring catches that are inserted into notches extending from said hole in said computer body to secure said hard disk drive case in its closed position within said computer body.

10. A hard disk drive mounting assembly as set forth in claim 9, wherein said spring catches have snags that get caught within the computer body in the locking condition and are released by physical force applied from outside to compress the spring catches and release the snags from the locking condition.

11. A hard disk drive mounting assembly as set forth in claim 8, wherein said hard disk drive case has a stop, the movement of which stop is constrained by the inside surface of the computer body during said opening operation to limit the swinging of said hard disk drive case out of said computer body through said hole in said side thereof.

12. A hard disk drive mounting assembly as set forth in claim 8, wherein said second end of said hard disk drive case is a closed end with a substantially rectangular doorhole therethrough provided with:

first and second case doors that swing from opposite edges of said doorhole, that are spring-loaded to close within said doorhole so as to be substantially flush with said closed second end, that open inward of said hard disk drive case, and that do not completely meet when closed.

13. A hard disk drive mounting assembly as set forth in claim 12 having a spring cable holder in which a cable may be hung mounted on an exterior surface of said second end of said hard disk drive case.

14. A hard disk drive mounting assembly as set forth in claim 13, wherein said case doors have rollers on their end portions.

15. A hard disk drive mounting assembly as set forth in claim 8, wherein said surface having said hole through which said hard disk drive case swings is a lateral side of said computer body.

16. A hard disk drive mounting assembly as set forth in claim 8, wherein said hard disk drive having slide members on its both sides and having rail hooks on predetermined positions of said sliding members is installed within said hard disk drive case, with said slide members engaged with respective ones of said channel rails and with said rail hooks engaged with respective ones of said apertures.

* * * * *